United States Patent [19]
Olivier et al.

[11] Patent Number: 5,214,612
[45] Date of Patent: May 25, 1993

[54] SWING PLATE LATCH MECHANISM

[75] Inventors: Andrë W. Olivier, New Orleans; Christian J. Christensen, Harahan, both of La.

[73] Assignee: The Laitram Corporation, Harahan, La.

[21] Appl. No.: 920,264

[22] Filed: Jul. 27, 1992

[51] Int. Cl.$^5$ .............................................. G01V 1/38
[52] U.S. Cl. ........................................ 367/16; 367/17; 367/20; 114/245
[58] Field of Search ...................... 367/16, 17, 18, 19, 367/20, 154, 106, 130; 181/110; 114/245, 244

[56] References Cited
U.S. PATENT DOCUMENTS

| | | | |
|---|---|---|---|
| 3,440,992 | 4/1969 | Chance | 367/16 |
| 3,605,674 | 9/1971 | Weese | 114/245 |
| 3,931,608 | 1/1976 | Cole | 367/17 |
| 4,222,340 | 9/1980 | Cole | 114/245 |
| 4,290,124 | 9/1981 | Cole | 367/18 |
| 4,709,355 | 11/1987 | Woods et al. | 367/16 |
| 4,879,719 | 11/1989 | Dumestre, III | 367/20 |

*Primary Examiner*—J. Woodrow Eldred
*Attorney, Agent, or Firm*—James T. Cronvich

[57] ABSTRACT

For confidently coupling towed external devices to a marine seismic cable, a latch mechanism having a novel swing plate to improve the adjustability of the mechanism and provide a positive, clearly visible indication of latched and unlatched conditions. The swing plate serves as an external linkage between a rotatable adjustment head for a locking pin and a translatable lever arm for a locking rod. The locking pin and the locking rod extend from a latch housing on a towed device, such as a cable-leveling bird, and engage with a keyhole slot in a locking collar on the streamer. The swing plate engages the adjusting head, which protrudes from a side of the housing, in a push-nut engagement. Shoulders positioned approximately radially opposite each other on the swing plate push against the lever arm, which also protrudes from the side of the housing, as the adjustment head is rotated to completely extend or retract the locking rod into the mating slot, thereby locking or unlocking the mechanism as the lever arm is jammed to the top or the bottom of a guide slot. As the adjustment head is rotated to force the lever arm to the top or the bottom of the guide slot, a positive stop, which is clearly evident to an operator performing the adjustment, is provided. The structure of the swing plate, such as structure along a radial sector of the swing plate between the shoulders, is also used to occlude and reveal clearly visible indicia of a locked or unlocked mechanism as the swing plate is rotated.

17 Claims, 6 Drawing Sheets

SWING PLATE LATCH MECHANISM

FIELD OF THE INVENTION

This invention relates to coupling mechanisms and, more particularly, to an improved mechanism for coupling external devices, especially cable-leveling birds, to a marine seismic streamer.

BACKGROUND OF THE INVENTION

Seismic streamers used in marine exploration include a streamer cable towed behind a survey vessel. External cable-leveling devices and position-determining sensors, such as acoustic transducer pods, are coupled to the streamer at various positions along its length. The cable-leveling devices, known as birds, include motor-controlled vanes, or wings, which set the depth of the cable.

Typical mechanisms for coupling birds and acoustic pods to a streamer include collars attached at selected positions along the length of the streamer. Each collar comprises cylindrical inner and outer races surrounding the streamer. The inner race is affixed to the streamer. The outer race, to which the bird or acoustic pod is coupled, can freely rotate about the inner race and, hence, the streamer. The outer race, or locking collar, has a keyhole-shaped locking slot designed to slidably receive a dovetail pin extending from a chamber in a pylon on the bird or pod. The dovetail pin has a flat top tapering on opposite sides toward a narrow neck. The neck extends from a broader cylindrical body. The neck is narrow enough to permit the pin to slide along the locking slot in the locking collar. The pylon is attached to the locking collar by inserting the top of the extended dovetail pin through the circular opening in the locking slot and sliding the neck of the dovetail pin along the slot and away from the circular opening. As the pin slides to the end of the locking slot opposite the circular opening, a locking rod, under spring pressure in a chamber in the pylon, pops into the circular opening of the locking slot, thereby preventing the dovetail pin from sliding back and releasing the engagement.

An eccentric pin extending transversely from one side of the pylon to the other has a central camming surface that engages the domed bottom of the dovetail pin. The eccentric pin terminates in screwdriver- or wrench-adjustable drive surfaces, such as slotted hexagonal adjustment heads, external to the pylon. As the eccentric pin is rotated, the camming surface forces the dovetail pin between extended and retracted positions. With the dovetail pin retracted and the locking rod extended, the pylon is held fast to the collar. The adjustment head has a small indented reference mark to indicate the position of the eccentric pin.

Studs, attached to the spring-loaded locking rod and protruding through slots on opposite sides of the pylon, act as levers for manually retracting the locking rod from its locked position in the circular openings of the locking slot.

A latching mechanism manufactured by Syntron, Inc. of Houston, Tex. and shown in its U.S. Pat. No. 4,290,124 to Cole operates as just described. A similar mechanism, using a locking screw instead of a locking pin, is described in Syntron's U.S. Pat. No. 3,931,608, also to Cole. In both Syntron locking mechanisms, the locking pin or screw is separately adjustable from the locking rod. A third mechanism, manufactured by Digi-COURSE, Inc. of Harahan, La., a wholly-owned subsidiary of the assignee of this invention, is similar to that hereinbefore described, but differs in that the locking pin and the locking rod are coupled together by an internal linkage so that loosening (extending) the locking pin also retracts the locking rod, and vice versa. In the DigiCOURSE mechanism, there are no studs on the locking rod, adjustment being by means of the adjustment heads. A fourth mechanism, having a different mode of operation from the previous three and from the improved mechanism of this invention, is the subject of U.S. Pat. No. 4,879,719 to Dumestre. The Dumestre mechanism includes a lever-actuated cylinder with a cam extending through a locking slot. The lever is used to rotate the cylinder and its cam between insertable and locked orientations.

In the case of a cable-leveling bird, two similar latching mechanisms spaced about a foot from each other are used to fasten the bird pylon to the collar—one near the front of the bird, the other in the vicinity of the bird's wings. Depending on the orientation of the wings, access to the latching mechanism near the wings may be obstructed. With the Syntron mechanism, it is difficult to disengage the locking rod to release the bird because access by hand to the studs is awkward whenever the wings are more or less horizontal. With the Digi-COURSE mechanism, although it has no hand-maneuverable studs to disengage the locking rod, visual access to the reference mark on the locking mechanism's adjustment heads is impaired. Visual access is important because it provides a clear indication that the locking mechanism is, in fact, latched. An improperly latched mechanism can result in the costly loss of a bird at sea and the even more costly disruption of the seismic data-gathering process. For example, grit or other debris contaminating the locking rod's chamber in the pylon can prevent the spring from forcing the rod into its extended, locked position. Without an easily viewed visual indication that the locking rod is fully extended, it is more likely that improperly latched birds are deployed. Another problem is that debris in the water can bump into the studs of the locking rod, forcing the rod to disengage from its locked position during deployment.

Thus, an object of the invention is to prevent cable-leveling birds and other collar-attached devices from falling off seismic streamer cables during deployment or servicing.

The invention further provides advantages such as a single adjustment point for both the dovetail pin and the locking rod, a clearly visible indication of locked and unlocked conditions to increase operator awareness of the existing condition, and positive stops signifying complete engagement and disengagement of the locking rod.

SUMMARY OF THE INVENTION

These advantages and others are provided by the addition of a swing plate to a collar-latching mechanism housed in a pylon on a streamer-towed device. Such a mechanism includes a rotatable adjustment head to adjust a locking pin and translatable stud to latch and unlatch a spring-loaded locking rod. The adjustment head protrudes from a transverse bore in the pylon and the stud, terminating a lever arm for retracting the locking rod, protrudes from a vertical slot in the side of the pylon.

The swing plate of the invention comprises a disk with a plurality of internal engagement surfaces arranged to face each other across a central opening. The engagement surfaces on the swing plate mate with mating surfaces on the rotatable adjustment head of the eccentric pin. Notches between consecutive engagement surfaces on the swing plate provide spring action. In this way, the swing plate can be pressed onto the adjustment head and held firmly in place on the head just as a push nut.

The swing plate comprises two sectorial portions extending from the central opening. The first portion extends to a first radius r measured from the center of the opening. The second sectorial portion extends to a second radius R, where R>r. The distance from the locking pin adjustment head to the locking rod stud is greater than r and less than R. Radial shoulders formed at the interfaces of the two sectorial portions serve to jam the locking rod stud against either end of the slot thereby positively locking or unlocking the locking rod as the locking pin is simultaneously adjusted to locked or unlocked positions.

Clearly visible indicia of the status (locked o unlocked) of the mechanism are further provided on the side of the pylon. The indicia are selectively occluded and revealed as the wider sectorial portion of the swing plate is rotated between locked and unlocked positions. In a preferred embodiment, the indicia are located on the side of the pylon at a distance of between r and R from the center of the adjustment head.

BRIEF DESCRIPTION OF THE DRAWINGS

The preceding features of the invention will be more clearly understood from the following description of the accompanying drawings in which.

DETAILED DESCRIPTION OF THE INVENTION

Figure 1:
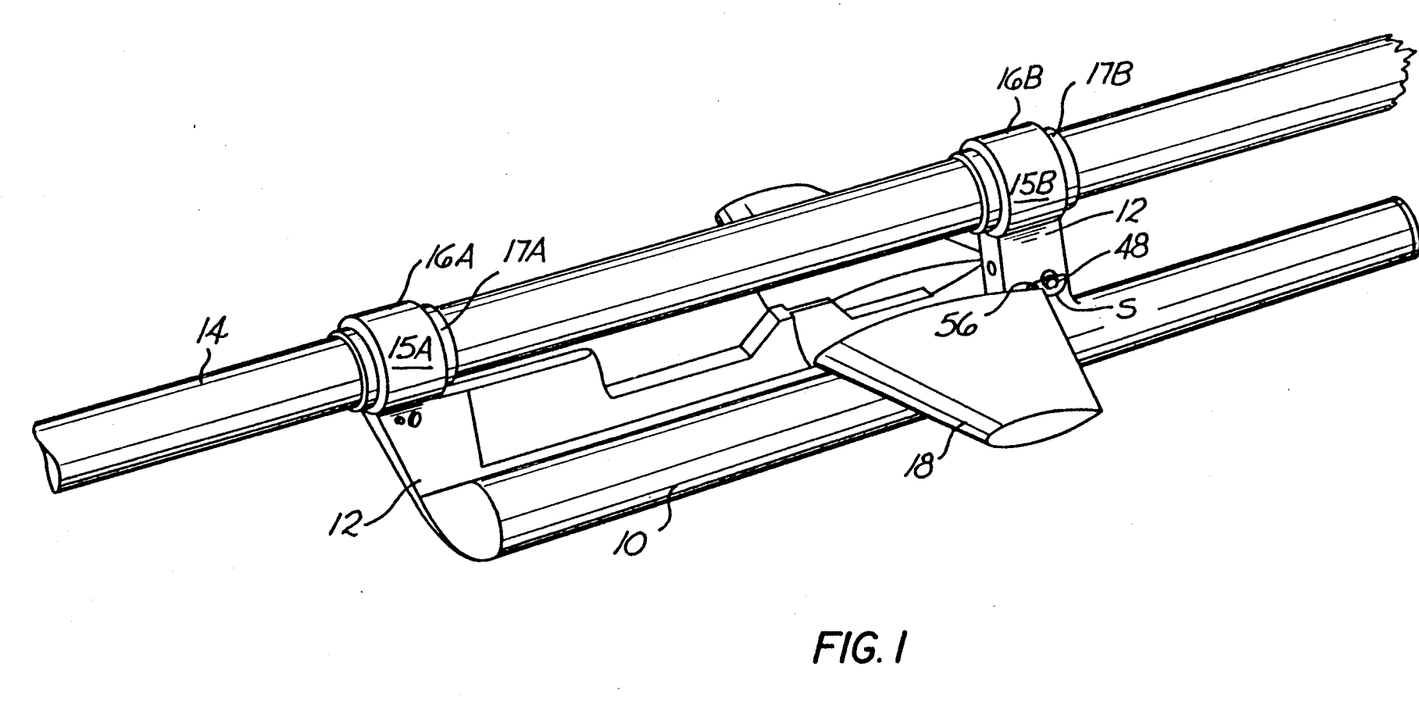
FIG. 1 is a general view of a portion of a marine seismic streamer with a cable-leveling bird attached thereto.

FIG. 1 shows a cable-leveling bird 10 attached to a streamer cable section 14 by means of a pair of front 15A and rear 15B collar assemblies, each comprising a cylindrical inner race 17A and 17B surrounding and affixed to the streamer 14 and a cylindrical outer race, or locking collar, 16A and 16B engaged with the inner race such that the outer race 16A and 16B can rotate around the inner race 17A and 17B. The bird 10 is fastened to the locking collars 16A and 16B by means of latching mechanisms housed in a pylon 12 on the bird. Thus, a bird 10 attached to a streamer 14 is free to rotate about fixed positions on the cable by means of the inner and outer races 16 and 17. During deployment, leveling planes, or wings 18, on the bird 10 control the bird's depth. When set to maintain a certain depth, the wings 18 remain relatively stable with the streamer 1 4 free to rotate within the collars 15.

Figure 2:
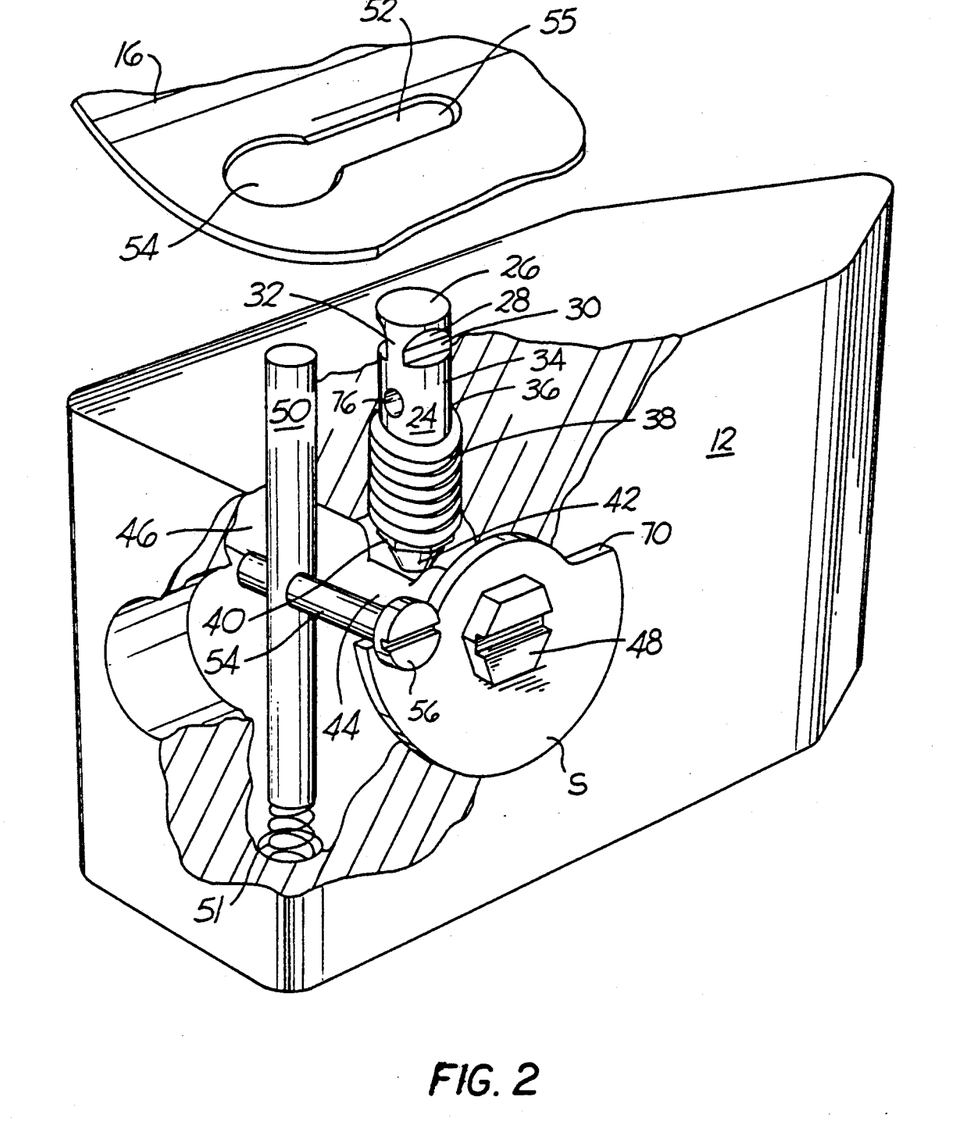
FIG. 2 is a cutaway perspective of a bird pylon and streamer locking collar illustrating the improved locking mechanism of the invention.

The latching mechanism of the invention is shown in detail in FIG. 2, a cutaway perspective. The mechanism in the pylon 12 comprises two latching components—a dovetail pin 24 and a locking rod 50—both of which engage the locking collar. The dovetail pin 24 has a flat top 26 with a tapered surface 28 and a flat vertical surface 30 on opposite sides forming a narrow neck 32. The upper portion 34 of the locking pin 24 below the neck 32 is generally cylindrical. The middle portion 36 of the locking pin 24 is also cylindrical but with a narrower diameter than the upper portion 34 so as to accommodate compressible Belleville washers 38. Bottom portion 40 has a flat upper surface to support the Belleville washers 38 and a domed bottom 42 to slidably engage a central eccentric camming surface 44 on a transverse eccentric pin 46. The eccentric pin 46 terminates in an adjustment head 48 at one or both ends. In the preferred embodiment, the eccentric pin 46 terminates in slotted, hexagonal adjustment heads 48 at each end extending out of a transverse bore in the pylon 12. The inside surfaces of the adjustment heads 48 are in tight frictional contact with the sides of the pylon 12 so that adjustment of the dovetail pin mechanism with fingers alone is not possible. An adjustment tool such as a screwdriver engaging the slot or a wrench engaging the horizontal surface of the adjustment head 48 must be used to engage and disengage the dovetail pin mechanism.

The second component in the pylon 12 comprises an elongated cylindrical locking rod 50. A spring 51 at the bottom of a vertical bore 53 biases the locking rod 50 up into an engaged position. Lever arms 54 extend from opposite ends of the locking rod 50 near midlength. The lever arms 54 extend through substantially vertical slots 60 in each side of the pylon 12 and terminate in studs 56.

The dovetail pin 24 and the locking rod 50 couple the pylon 12 to the locking collar 16 through a keyhole slot 52 in the locking collar 16. The keyhole slot 52 has a circular entry 54 at one end and a longitudinal slot 52 extending therefrom toward a second end.

Figure 3A:
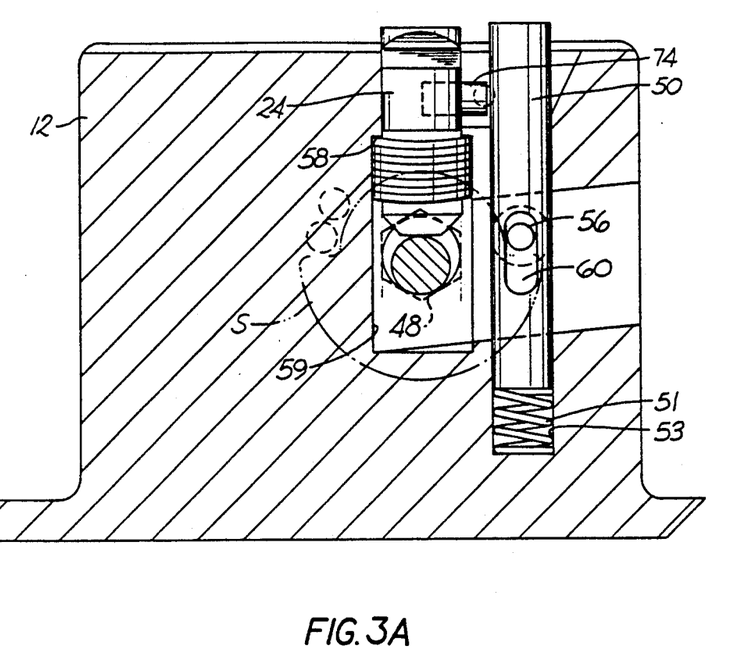
FIG. 3A is a cutaway side view of the locking mechanism of the invention in the locked position.

The mechanism is latched as indicated in FIGS. 2 and 3A by first inserting the top 26 of the dovetail pin 24 through the circular entry 54 in the keyhole slot 52 of the locking collar 16. Because the narrow neck 32 of the dovetail pin 24 is slightly narrower than the width of the longitudinal slot 55, the dovetail pin 24 can slide along the slot 55 toward the end opposite the circular entry 54. As the dovetail pin approaches the end of the longitudinal slot 56, the locking rod 50, its spring 51 held in compression by the bottom surface of the locking collar 16, pops into the circular entry 54 now in alignment, thereby locking the pylon 12 to the locking collar 16. To prevent the bird 10 from vibrating during deployment, the dovetail pin 24 is retracted by rotating the adjustment head 48 of the eccentric pin 46 until the eccentric camming surface 44 is in its lower position. In this locked position, the Belleville washers 38 are somewhat relaxed, but still exert enough spring force against the shoulder 58 of the dovetail pin chamber 59 to hold the locking collar fast to the pylon 12.

Figure 3B:
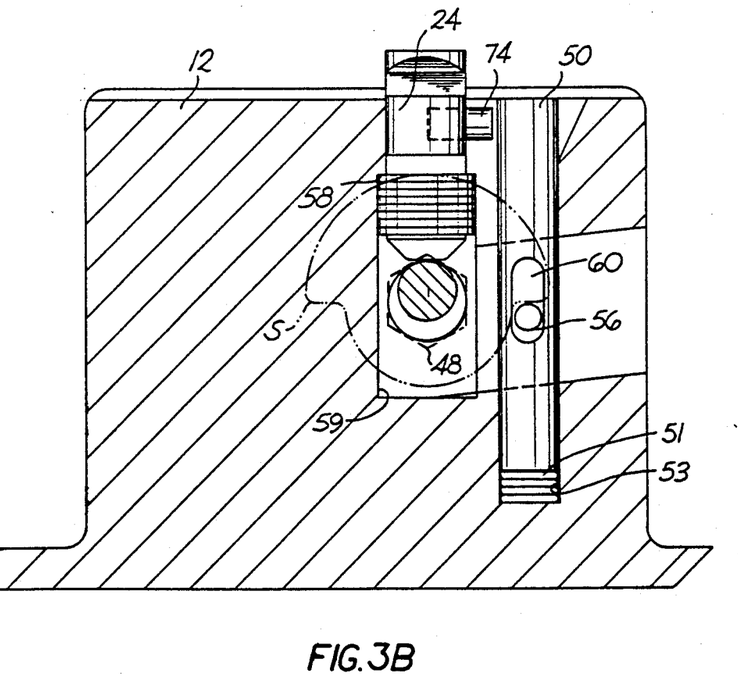
FIG. 3B is a cutaway side view as in FIG. 3A, but showing the unlocked position.

The mechanism is unlatched as indicated in FIG. 3B. The dovetail pin 24 is extended by rotating the adjustment head 48 of the eccentric pin 46 until the camming surface 44 is in its upper position. In this position, the Belleville washers 38 are fully compressed between the shoulder 58 of the dovetail pin chamber 59 and the bottom portion 40 of the dovetail pin 24. The locking rod 50 is then retracted against its spring 51 by pushing the studs 55 down in the vertical slots 60 in the sides of the pylon 12. With the locking rod 50 retracted from the circular entry 54 in the keyhole slot 52, the dovetail pin 24 can slide along the slot 55 toward the entry 54 through which the dovetail pin 24 can be fully disengaged from the keyhole slot 52, thereby freeing the pylon 12 from the locking collar 16.

Figure 4:
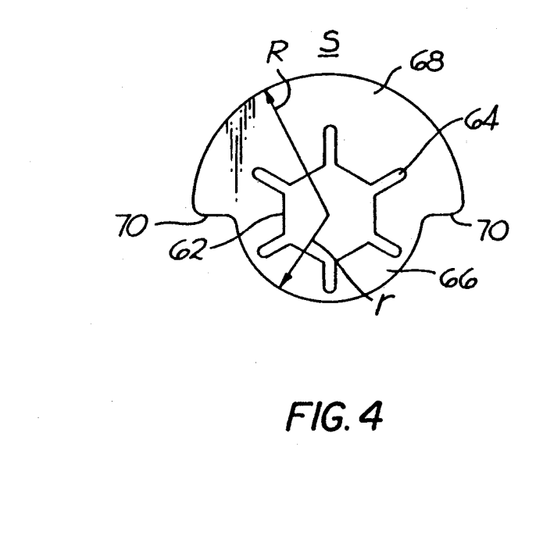
FIG. 4 is a top view of the swing plate of the invention.

The locking rod 50 of the invention extends substantially below the level of the eccentric pin 46. The vertical slot 60 for the lever arm 54 and the stud 56 is centered at about the level of the eccentric pin 46 and spaced therefrom a distance d. The invention provides a single-point adjustment of both the locking rod 50 and the dovetail pin 24 by means of a novel swing plate S. The swing plate S, shown in detail in FIG. 4, is a thin metallic disk stamped or cut preferably from a sheet of stainless steel. Six internal engagement edges 62 define a central hexagonal opening slightly smaller than the hexagonal adjustment head 48 of the eccentric pin 46. Grooves 64 extending radially from the corners of the hexagonal opening give the swing plate S a spring-action central engagement capability similar to that of a push nut. The swing plate S comprises two circular sectorial portions—a first sectorial portion 66 having a first radius r and a second sectorial portion 68 having a second radius R, wherein R>r. In the preferred embodiment, each sector is about 180°. The difference in radii results in a pair of swing plate shoulders 70 radially connecting the circumference of the first sectorial portion 66 to the circumference of the second sectorial portion 68.

The swing plate S is firmly attached to the adjustment head 48 by the push-nut-type engagement of the engagement edges 62 of the swing plate S with the hexagonal adjustment head 48. The radius R of the second sectorial portion 6 is of sufficient length that the swing plate shoulders 70 can engage the lever arms 54 of the locking rod 50 just under the studs 56. In this way, the swing plate S provides a visible, external linkage between the dovetail pin 24 and the locking rod 50 so that a single adjustment point, e.g., the adjustment head 48, is all that is required to latch and unlatch the bird from the streamer. Although the swing plate S of the preferred embodiment is designed to engage a hexagonal head, one skilled in the art can appreciate that engagement surfaces of other shapes, such as square, are within the scope of the invention.

Cooperation of the swing plate S with the dovetail pin 24 and the locking rod 50 is shown in FIGS. 1, 3A, and 3B. In the unlatched position detailed in FIG. 3B, the adjustment head 48 is rotated until the swing plate shoulder 70A joins the lever arm 54 of the locking rod 50 into the bottom of its vertical slot 60. In this unlatched position, the second sectorial portion 68 with the larger radius R is positioned above the first sectorial portion 66 with the smaller radius r. To latch the mechanism, the adjustment head 48 and, thereby, the swing plate S, are rotated slightly more than 180°, as shown in FIG. 3A, until the lever arm 54 of the locking rod 50 is jammed into the top of its slot 60 by the other shoulder 70B. Thus, adjustment of the adjustment head 48 alone can simultaneously extend the locking rod 50 into and retract the dovetail pin 24 from the locking collar 16 to latch the pylon 12 in place or simultaneously retract the locking rod 50 from and extend the dovetail pin 24 into the locking collar 16 to unlatch the pylon 12. Because the force that can be exerted by the swing plate S to extend the locking rod 50 into the latched position is much greater than the force exerted by the spring 51, it is unlikely that dirt or grit contaminating the locking rod chamber could not be forced out by merely rotating the mechanism into the latched position. Even if the dirt cannot be forced out, the operator will know that the mechanism is jammed and that he must take corrective action. Thus, the operator does not just have to assume that the mechanism is fully latched.

Figure 5:
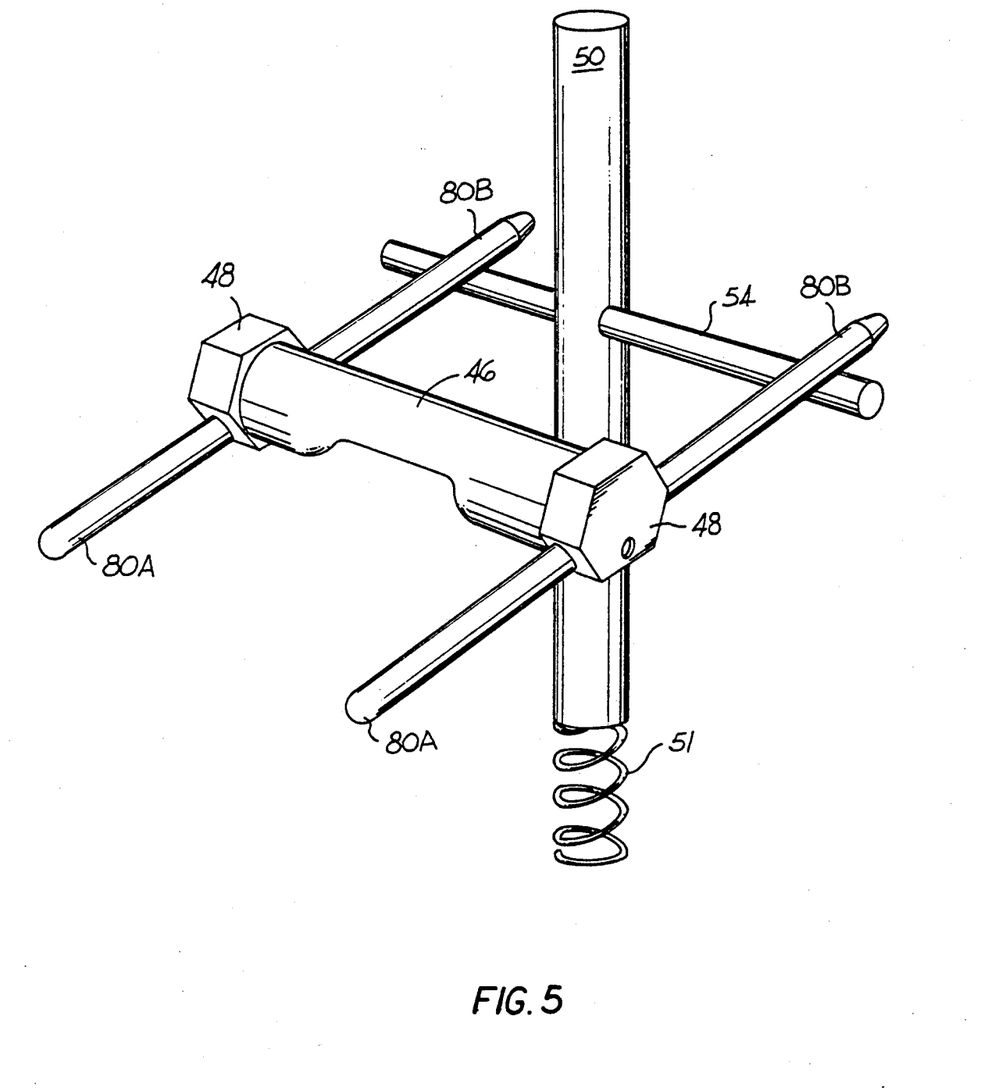
FIG. 5 is a perspective view of the mechanical linkage of another embodiment of the invention.

The positive cooperative locking and unlocking of the locking rod 50 with the operation of the dovetail pin 24 could also be achieved in other ways, such as with a pair radial spokes 80 extending to a length of at least d measured from the center of the adjustment head 48, as shown in FIG. 5. The spokes could, for example, extend from retaining cavities 82 in the adjusting head 48, one spoke 80A forcing the stud 56 into the locked position. The other spoke 80B, situated more or less opposite the first spoke, would be used to force the stud 56 into the unlocked position. Thus, the spokes 80 could perform the positive locking function of the swing plate shoulders 70.

Figure 6A:
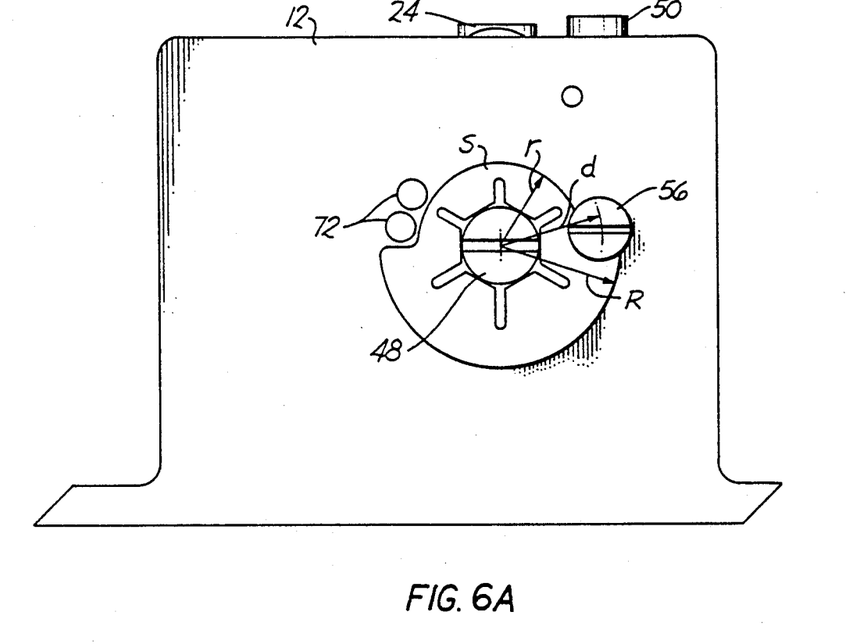
FIG. 6A is a side view of a bird pylon showing the clear visible indication of a locked mechanism by means of visible indicia and the position of the swing plate of the invention.
Figure 6B:
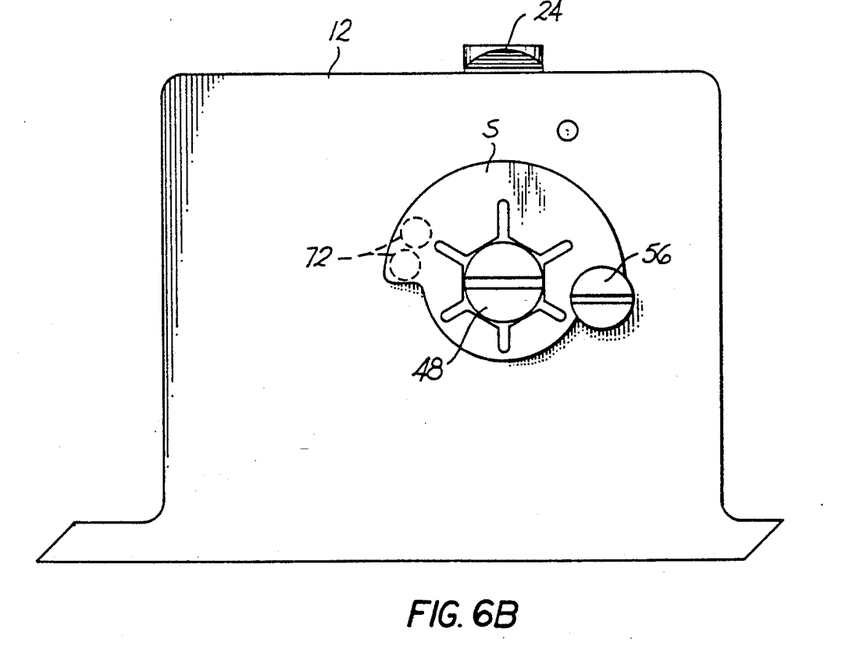
FIG. 6B is the same view as in FIG. 5A, but for an unlocked position.

Besides providing the advantages of single-point adjustment and positive cooperation between the locking rod 50 and the dovetail pin 24, the improved latching mechanism provides easy-to-view indicia of the status of the latch. As shown in FIG. 1, access to the rear latch assembly is obstructed with the wings 18 in the position shown. As shown in FIG. 6A, indicia of a completely latched mechanism are provided by a pair of large painted dots 72. The dots would typically be painted in slight indentations in the surface of the pylon 12. The dots are positioned from the center of the adjustment head at a radial distance of between r and R. With the mechanism latched, both dots 72 should be clearly visible with one of the dots almost tangent to the swing plate shoulder 70A. Only if both dots 72 are completely visible is the mechanism completely latched. In the unlatched position, shown in FIG. 6B, the second sectorial portion 68 of greater radius R covers the dots 72, indicating that the mechanism is unlatched. Thus, the operator is made fully aware of the status of the latching mechanism. All guesswork is removed.

Although a pair of large dots 72 is shown in the preferred embodiment, other indicia could also be used. For example, wording such as "LOCKED," different colored dots, or internationally recognized symbols cold be used. Furthermore, another set of indicia indicating an unlocked condition that is uncovered as the swing plate S is rotated to an unlatched position could also be used. The goal is an unambiguous and clearly visible indication of a completely latched mechanism.

Figure 7:
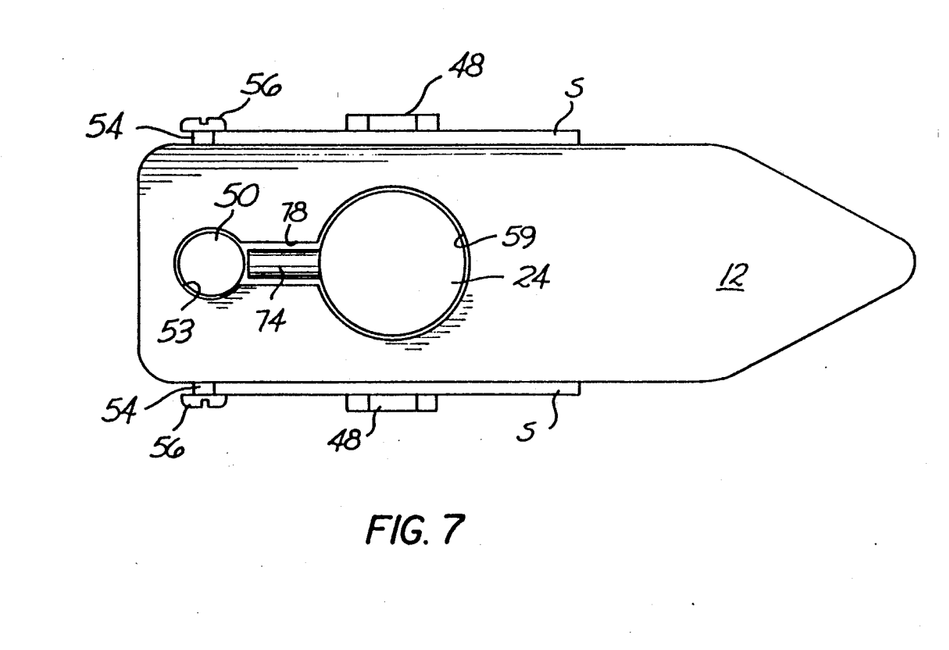
FIG. 7 is a top view of the pylon illustrating the anti-twist bar in accordance with the invention.

Another feature of the invention is illustrated in FIG. 7, a top view of the pylon 12. An anti-twist bar 74 extends from a cavity 76 in the upper portion 34 of the dovetail pin 24 into a longitudinal slot 78 in the pylon 12. The anti-twist bar 74 prevents that the dovetail pin 24 from twisting out of its normal position because of hydrodynamic and other forces experienced by the bird 10 during deployment and servicing.

The improved streamer cable latch mechanism described herein provides, in addition to single-point adjustment and positive cooperation of the locking rod and dovetail pin, increased operator awareness of the status of the latch mechanism that should eliminate the guesswork inherent in other similar mechanisms and, thereby, decrease the incidence of birds becoming unlatched and lost during deployment.

Because many design variations and different embodiments may be made within the scope of the inventive concept taught herein, and because many modifications may be made in the embodiments detailed herein according to the descriptive requirement of the law, the details herein ar to be interpreted as illustrative and not in a limiting sense.

What is claimed is:

1. In a seismic streamer latch mechanism for fastening a towed device to a locking collar on a seismic streamer, the latch mechanism being of the type having a pair of spaced-apart locking projections extensible from a housing on the towed device into a mating receptacle on the locking collar, one of the projections being adjustable by means of a rotatable adjustment head, the other one of the projections being adjustable by means of a lever arm, an improved latch mechanism comprising:

first and second end stops in the housing defining a slide path therebetween for the lever arm;

a swing linkage including means for attachment to the rotatable adjustment head such that said swing linkage is rotatable with the adjustment head, said swing linkage further including an engagement surface spaced from the means for attachment by a distance sufficient to engage the lever arm as said swing linkage is rotated through an engagement angle for which the engagement surface intersects the slide path, whereby rotational adjustment of the adjustment head through the engagement angle causes the engagement surface to push the lever arm along the slide path until the lever arm reaches one of said end stops.

2. The improved latch mechanism of claim 1, wherein the housing includes structure defining a slot in a side of the housing through which the lever arm extends, said structure forming a each end of the slot said first and second stops, respectively.

3. The improved latch mechanism of claim further comprising indicia on a side of the housing and wherein said swing linkage further comprises an occluding portion that rotates with the adjustment head so as to alternately occlude and reveal said indicia as the adjustment head is rotated.

4. The improved latch mechanism of claim 1, wherein said swing linkage comprises a swing plate including a push-nut means for attachment to the adjustment head, said swing plate being firmly attachable to the adjustment head external to the housing.

5. The improved latch mechanism of claim 4, further comprising indicia on a side of the housing and wherein said swing plate further comprises a occluding portion that rotates with the adjustment head so as to alternately occlude and reveal said indicia as the adjustment head is rotated.

6. The improved latch mechanism of claim 5, wherein said swing plate further comprises a first sectorial portion extending from said means for attachment to a first radial distance r and a second sectorial portion extending from said internal engagement means to a second radial distance R, wherein $r<R$.

7. The improved latch mechanism of claim 4, wherein said swing plate comprises push-nut means for attachment including a plurality of closely-spaced tabs arranged about a central opening, each of said tabs having an engagement edge defining a part of said central opening and engaging a similar mating surface on the adjustment head, said engagement edges defining said central opening having a similar shape and slightly smaller dimensions than the outer dimensions of the adjustment head, whereby said swing plate is firmly attached to the adjustment head by spring action of said tabs against the adjustment head.

8. The improved latch mechanism of claim 7, wherein said swing plate comprises six tabs each having straight engagement edges, thereby forming a substantially hexagonal central opening, and wherein the adjustment head is hexagonal in shape.

9. The improved latch mechanism of claim further comprising a first swing linkage on one side of the housing and a second swing linkage on the opposite side of the housing, both of the linkages working in synchronism.

10. A swing plate for a latching mechanism of the type having a rotatable adjustment head and a translatable locking stud each extending from the side of a latch housing and separated by a distance d, said swing plate comprising:

a thin disk;

said disk having internal engagement means for securely engaging said disk with the rotatable adjustment head;

said disk having a first sectorial portion extending from the center of said internal engagement means to a first radial distance r and said disk having a second sectorial portion extending from the center of said internal engagement means to a second radial distance R, wherein $r<d<R$.

11. The swing plate of claim 10, wherein said first sectorial portion and said second sectorial portion each span sectors of about 180°.

12. The swing plate of claim 10, wherein said internal engagement means comprises push-nut means for attachment including a plurality of closely-spaced tabs arranged about a central opening, each of said tabs having an engagement edge defining a part of said central opening and engaging a similar mating surface on the adjustment head, said engagement edges defining said central opening having a similar shape and slightly smaller dimensions than the outer dimensions of the adjustment head, whereby said swing plate is firmly attached to the adjustment head by spring action of said tabs against the adjustment head.

13. The swing plate of claim 12, wherein said push-nut means comprises six tabs each having straight engagement edges, thereby forming a substantially hexagonal central opening, and wherein the adjustment head is hexagonal in shape.

14. The swing plate of claim 10, further comprising means for selectively occluding a portion of a side of the latch housing.

15. The swing plate of claim 14, wherein said means for selectively occluding a portion of the side of the latch housing comprises an arcuate portion of said second sectorial portion of said disk, said arcuate portion comprising that part of said second sectorial portion disposed at a distance greater than r from the center of said internal engagement means.

16. A latch mechanism for coupling a towed device to streamer cable, comprising:

a locking collar attached to the streamer cable, said locking collar having an engagement slot;

a latch housing attached to the towed device, said latch housing having a top surface and a pair of opposite sides;

said latch housing further having a first chamber and a second chamber, said first chamber and said second chamber each extending from a respective opening in the top surface of said housing;

a spring in the bottom of said first chamber;

a locking rod in said first chamber with one end engaging said spring and with an opposite end for engagement with the engagement slot of said locking collar;

said latch housing further having a bore extending transversely therethrough from a side of said housing and intersecting said second chamber;

a cam rotatably mounted in said bore, said cam terminating in an adjustment head extending from a side of said latch housing;

a locking pin having a narrow neck at a first end, said neck extending from said second chamber through the top of said latch housing for sliding engagement with the engagement slot of said collar;

said locking pin having a second end riding on said cam such that, as said cam rotates, said locking pin slides back and forth along said second chamber;

said latch housing further having a slot in a side of said housing, said slot being disposed parallel to said first chamber, the midpoint of said slot situated a distance d from the center of said bore;

a lever arm extending transversely from said locking rod and through said slot;

a swing plate having internal engagement edges for firmly engaging said adjustment head so that said swing plate rotates with said adjustment head;

said swing plate further having a first sectorial portion extending to a distance r from the center of said internal engagement means and having a second sectorial portion extending to a distance R from the center of said internal engagement means, wherein $r<d<R$, thereby forming an outer engagement surface on said swing plate at a distance of between r and R measured from the center of said internal engagement means, said outer engagement surface pushing said lever arm along said slot as said adjustment head is rotated.

17. The latch mechanism of claim 16, further comprising indicia on the side of said latch housing and wherein said swing plate further comprises an occluding portion that rotates with said adjustment head so as to alternately occlude and reveal said indicia as said adjustment head is rotated.

* * * * *